(12) United States Patent
Reinert et al.

(10) Patent No.: US 8,590,376 B2
(45) Date of Patent: Nov. 26, 2013

(54) MICROELECTROMECHANICAL INERTIAL SENSOR WITH ATMOSPHERIC DAMPING

(75) Inventors: Wolfgang Reinert, Neumuenster (DE); Martin Heller, Itzehoe (DE)

(73) Assignees: Fraunhofer-Gesellschaft zur Foerderung der Angewandten Forschung e.V., Munich (DE); Maxim Integrated GmbH, Lebring (AT)

( * ) Notice: Subject to any disclaimer, the term of this patent is extended or adjusted under 35 U.S.C. 154(b) by 304 days.

(21) Appl. No.: 12/934,783

(22) PCT Filed: Mar. 25, 2009

(86) PCT No.: PCT/EP2009/053541
§ 371 (c)(1),
(2), (4) Date: Sep. 27, 2010

(87) PCT Pub. No.: WO2009/118355
PCT Pub. Date: Oct. 1, 2009

(65) Prior Publication Data
US 2011/0016972 A1      Jan. 27, 2011

(30) Foreign Application Priority Data
Mar. 27, 2008  (DE) .......................... 10 2008 016 004

(51) Int. Cl.
*G01P 1/02* (2006.01)
*G01P 15/125* (2006.01)
*G01C 19/56* (2012.01)

(52) U.S. Cl.
USPC ..... 73/493; 73/514.32; 73/504.12; 73/504.14

(58) Field of Classification Search
USPC ................. 73/510, 511, 493, 514.32, 514.29, 73/504.12, 504.14, 504.04
See application file for complete search history.

(56) References Cited

U.S. PATENT DOCUMENTS

| | | | |
|---|---|---|---|
| 4,269,624 A | 5/1981 | Figni | |
| 4,574,327 A * | 3/1986 | Wilner | ....................... 361/283.4 |
| 4,977,035 A | 12/1990 | Travis et al. | |
| 5,320,496 A | 6/1994 | Manini et al. | |
| 5,837,935 A * | 11/1998 | Carper et al. | ............... 174/50.51 |
| 5,996,409 A * | 12/1999 | Funk et al. | ................. 73/504.04 |
| 6,236,156 B1 | 5/2001 | Ito | |

(Continued)

FOREIGN PATENT DOCUMENTS

DE      198 13 13 941 A1      7/1993
DE      10 2006 016 260 A1    10/2007

(Continued)

OTHER PUBLICATIONS

International Search Report for PCT/EP2009/053541; mailed Jul. 9, 2009; 4 pages.

(Continued)

Primary Examiner — Helen Kwok
(74) Attorney, Agent, or Firm — Hunton & Williams LLP

(57) ABSTRACT

The present invention relates to an inertial sensor, preferably an acceleration sensor or multi-axis acceleration sensor as a microelectromechanical construction element, said sensor comprising a housing with at least one first gas-filled cavity in which a first detection unit is disposed moveably relative to the housing for detection of an acceleration to be detected, wherein the inertial sensor comprises a damping structure.

16 Claims, 2 Drawing Sheets

(56) References Cited

U.S. PATENT DOCUMENTS

| | | | |
|---|---|---|---|
| 7,004,025 B2 * | 2/2006 | Tamura | 73/511 |
| 8,250,920 B2 * | 8/2012 | Yamanaka et al. | 73/510 |
| 2002/0051258 A1 * | 5/2002 | Tamura | 358/514 |
| 2002/0180032 A1 * | 12/2002 | Sun et al. | 257/704 |
| 2005/0166676 A1 * | 8/2005 | Shimizu et al. | 73/504.12 |
| 2008/0136000 A1 * | 6/2008 | Fischer et al. | 257/682 |
| 2010/0025845 A1 * | 2/2010 | Merz et al. | 257/723 |
| 2011/0048129 A1 * | 3/2011 | Yamanaka et al. | 73/504.12 |

FOREIGN PATENT DOCUMENTS

| | | |
|---|---|---|
| EP | 1 167 979 | 1/2002 |
| WO | WO 02/42716 A2 | 5/2002 |
| WO | WO 2007/113325 * | 10/2007 |

OTHER PUBLICATIONS

Douglas Sparks, et al., "An all-glass chip-scale MEMS package with variable cavity pressure," J. Micromech. Microeng.; vol. 16; No. 11; IOP Publishing Ltd.; Nov. 1, 2006; pp. 2488-2491.

* cited by examiner

MICROELECTROMECHANICAL INERTIAL SENSOR WITH ATMOSPHERIC DAMPING

CROSS-REFERENCE TO RELATED APPLICATIONS

The application is a U.S. National Stage Application of International Application of PCT/EP2009/053541 filed Mar. 25, 2009, which claims the benefit of German Patent Application No. 10 2008 016 004.0 filed Mar. 27, 2008, the disclosures of which are herein incorporated by reference in their entirety.

FIELD OF THE DISCLOSURE

The present invention relates to an inertial sensor in form of a microelectromechanical device, preferably an acceleration sensor or a multi-axis acceleration sensor

BACKGROUND OF THE DISCLOSURE

By means of the micro-system technique miniaturised and cost-efficient devices may be produced which are used, for instance, in many technical fields as sensors or actuators with different functions. In particular in the automotive industry but also in mechanical engineering there is a need for complex micro-system devices fabricated in an integrated manner, which perform various measurement and control functions autonomously and with low energy requirement. Due to the continuous increase of the technological integration level of micro-systems there are attempts to fabricate micro-system devices in form of multi-sensor modules by using the so-called Wafer Level Packaging (WLP). A multi-sensor module is a sensor unit in which several single sensor modules or units are provided in a shared package or housing and which combines in itself the different functions of the single modules When fabricating sensor or multi-sensor modules by means of wafer level packaging the structures of several sensor or multi-sensor modules are formed on a substrate wafer by corresponding coating and etch processes. The functional units of several sensor or multi-sensor modules rest on the substrate wafer in a matrix-like manner side-by-side and/or on top of each other with intermediately provided isolation sections. The substrate wafers are connected to correspondingly produced cap wafers so that each of the (multi) sensor chips is firmly connected with a corresponding package chip. The composite consisting of the substrate wafer and the cap wafer is separated into individual chips, i.e., into the individual sensor or multi-sensor modules, after the connection on wafer level Due to the extensively parallel production technique the packaging on wafer level has enormous advantages compared to packaging on chip level with respect to costs, device integration density and yield.

One essential issue in the production of multi-sensor modules using WLP is the fact that, for fulfilling their respective functions, different sensor systems require individual operating pressures and/or individual gas compositions which in part significantly differ from each other. For example, resonant systems mostly have a high quality, that is why they are operated at low operating pressures. Resonant rotation rate sensors are typically operated at an operating pressure of several μbar up to several mbar, in order to avoid an undesired strong damping by the gas surrounding the sensor or its detection unit. Acceleration sensors that are based on the principle of inertia have usually to be damped strongly so that in this case typical operating pressures are of several 100 mbar. The following table illustratively shows respective typical operating pressures for various micro-systems:

| Sensor/device type | Operating pressure |
| --- | --- |
| Acceleration sensor | 300-700 mbar |
| Absolute pressure sensor | 1-10 mbar |
| Resonant sensor (e.g. rotation rate sensor) | 0.1 mbar |
| Bolometer | <0.0001 mbar |
| Oscillator | <0.0001 mbar |

Due to the parallel processing mode in WLP the establishment of corresponding pressures or gas compositions in the various cavities of single wafer to be separated into the individual modules represents an essential difficulty.

Applicant of the present invention has developed a method to integrate several sensor units requiring different operating pressures and/or gas compositions in a multi-sensor module, in which method cavities having defined and possibly different gas pressures and/or gas compositions may be formed during the WLP in a single process step. In this case, the assembly of substrate wafer and cap wafer is accomplished in a process chamber that may be provided with a gas or a gas mixture of a corresponding composition and at a corresponding pressure. Due to production process requirements first in each cavity of the single wafer the same gas composition at equal pressure is adjusted during the WLP. The gas pressure and/or the gas composition of different cavities are then differently established by using getter materials in selected cavities. However, this process technique does not enable an arbitrary adjustment of different pressure values and/or gas compositions in the respective cavities according to the present state of the art. If, for example, a resonant rotation rate sensor is to be operated in a first cavity at a pressure of about 0.1 mbar, then the maximum pressure that may be generated in other cavities of the single wafer using the above-described process technique is about 200 mbar. This pressure, however, is too low for a precise and reliable operation of acceleration sensors, a damping of vibrations can be ensured in an insufficient manner only.

SUMMARY OF THE DISCLOSURE

Starting from the above-described prior art it is an object of the present invention to provide an inertial sensor, in particular a multi-sensor module, wherein sensor units of reduced quality, such as high damped acceleration sensors, may be operated in a wide range of adjustable gas pressure and/or gas composition, in particular with low pressure, preferably together with sensor units of high and highest quality, such as resonant rotation rate sensors, bolometers and/or RF switches, in a single device.

This object is solved by an inertial sensor, preferably an acceleration sensor or a multi-axis acceleration sensor, comprising a housing having at least one first gas-filled cavity in which a first detection unit is movably arranged relative to the housing for detecting an acceleration to be detected, wherein the acceleration sensor comprises a damping structure that damps motion of the first detection unit in the housing at least in a measurement direction.

The invention generally relates to an inertial sensor. Thus, the invention contemplates acceleration sensors in the broadest meaning as well as, for example, rotation rate sensors. According to the invention a detection unit is to be understood as a unit or structure that may be used for detecting a quantity to be measured. Driven or undriven mass units are examples for active and passive structures, which respond to an acceleration to be detected including gravitation according to the principle of inertial mass or due to the influence of Coriolis accelerations. This response can be detected by evaluating measurements of a resulting change in position of the mass unit with respect to the housing or the substrate. The detection unit is thus a part of a sensor or is the sensor itself.

A multi-sensor module according to the invention is to be understood as a unit in which several individual sensors of any type are arranged on a substrate and are as the case may be accommodated in a shared package or housing. The individual sensors may have different functions (e.g., acceleration sensor with the active principle "inertial mass", acceleration sensor with the active principle "Coriolis acceleration", rotation rate sensors, actuators, resonators, displays, digital micro mirrors, bolometers, RF switches, pressure or temperature sensors, resonant magnetic field sensors, inclination sensors, etc.) and may be arranged in a shared cavity or in several different cavities.

By providing the damping structure with its active direction preferably oriented along the measurement direction of the first detection unit the quality factor of the sensor comprising the first detection unit may be reduced up to less than 1 even at low cavity pressures of about 100 mbar to 200 mbar, which corresponds to a remaining filling pressure of about 600 mbar to 1000 mbar. The remaining filling pressure is to be understood as the internal pressure in the closed cavity, for example adjusted by filling with argon prior to sealing the cavity. Thus by using WLP, inertial sensors and in particular multi-sensor modules including several individual sensors may be realized, which may be operated at a corresponding low cavity pressure with sufficient strong damping such that the sensor module comprising the first detection unit is insensitive to, e.g. vibrations, even at low cavity pressures, however without loosing its sensitivity with respect to the values (e.g. accelerations) to be detected.

In principle, the damping structure may have any configuration. Its effectivity may be restricted to one axis of motion or movement (measurement axis). With appropriate adaption a damping in two or three spatial directions may also be contemplated. It is important that the damping unit eliminates or at least minimizes due to its damping effect unwanted or undesired strong relative motions between the first detection unit and the housing. To this end, basically any known functional principles of damping mechanism may be applied.

In particular a damping may be achieved when a medium surrounding the first detection unit, mostly a gas or a gas mixture, is forced to flow through one or more constrictions (squash film damping) in the presence of a motion to be damped. The constrictions may be configured in any manner. For example, through-holes or protrusions and the like of appropriate dimensions may be formed in or on the first detection unit. Alternatively of additionally the channels or protrusions may be provided at or in the housing or other units that are positioned close to the first detection unit such that a damping effect can be obtained. Advantageously, for a housed sensor the damping structure is realized by arranging and configuring at least sections of the first detection unit and the housing or package such that a clearance there between is configured as a constriction or narrow through which the gas/gas mixture present in the cavity flows through when the first detection unit moves at least in the measurement direction.

The magnitude of the damping may be varied in a wide range by means of the individual geometric configuration(s) of the constriction(s). It has been recognized as being particularly advantageous when any of said sections of the first detection unit and of the housing/package are configured in a comb-like manner with comb fingers and clearances positioned in between. In this case the comb fingers of the first detection unit engage with the clearances of the comb-like structure of the package and vice versa. The orientation of the damping effect may be defined by a corresponding orientation of the comb fingers and/or by configuring comb fingers that are oriented along different directions. A particular strong damping is achieved when the comb fingers are transversely arranged with respect to the direction to be damped, e.g. the measurement direction. The preferred dimensions of the constrictions depend on the used design. Preferably, the width of the constrictions is in a range of 0.4 to 5 µm.

In one particularly advantageous embodiment the inertial sensor comprises, in addition to the first gas-filled cavity a second preferably also gas-filled cavity in which are provided a second detection unit—and possibly additional detection units—and a getter material. By means of the effect of the getter material the pressure and/or the gas composition in the second cavity may be adjusted different with respect to the pressure and/or the gas composition in the first cavity. In this way, multi-sensor modules can be produced, which comprise cavities with different gas compositions and/or different pressures. The pressures prevailing in a cavity having formed therein a getter material may be adjusted individually, for example up to a range of less than 0.1 µbar. In this manner, a pressure of about 200 mbar may be adjusted in the first cavity, while on the other hand in cavities comprising a getter material the pressure may be adjusted to values between about 1 mbar and 0.1 mbar and less. By using a corresponding damping, thus, in the first cavity a sensor with a quality factor of less than 1 may be operated and in the second and/or additional cavities comprising the getter material a sensor having a detection unit that requires a high quality with a quality factor of up to 7000 (for f=6000 Hz) or 20000 (for f=16000 Hz) may be operated. The detection unit arranged in the second or additional cavity may be, for example, a part of or may form an RF switch, of a bolometer or of a resonant sensor, such as a rotation rate sensor. In this case it is nevertheless possible to establish sufficiently high pressures in the first cavity by using WLP so that due to the additional effect of the damping structure a sufficient damping of the first detection unit is achieved. In this manner, the present invention enables for the first time to fabricate sensors with such different quality factors in the form of multi-sensor modules while using WLP.

The number of cavities of the inventive sensor may be increased as desired, wherein the pressure and/or the gas composition in each cavity or in selected cavities are adjustable according to the individual sensors or detection units provided therein. Preferably, the cavities are sealed with respect to each other and/or with respect to the environment. Depending on the type of the individual sensor modules and detection units in the respective cavities individual or several cavities may be connected to the environment via a gas passage and the like, for example when comprising absolute pressure sensors.

The first detection unit disposed in the first cavity may be an active or a passive structure. An example of a passive structure is a mass unit acting as an inertial mass, which is displaced relative to the housing/package due to its inertial mass upon interacting with an acceleration to be detected. An example of an active structure is a mass unit which is excited to move, for instance, in the form of a rotational oscillation, relative to the housing/package and by means of which changes in position or accelerations may be detected via influence of Coriolis accelerations.

The package/housing of the inertial sensor of the invention may basically be configured in any desired manner. During WLP it is produced by assembling a substrate wafer and a lid or cap wafer possibly by intermediate layering of a bond frame. The detection units and functional units of the inertial sensor usually are positioned on the substrate wafer, however, a positioning on the cap wafer is also possible.

The getter material used with the inertial sensor according to the invention may generally be of any type.

Getter materials used for a prolonged time include getter materials comprised of metals or alloys, such as Ba, Al, Ti, Zr, V, Fe and the like, which are used in cathode ray tubes, flat screens, particles accelerators or semiconductor processing equipment, cf. the U.S. Pat. No. 4,269,624, 5,320,496, 4,977, 035 or 6,236,156. These materials absorb or adsorb various gases via oxide and hybrid formation or simple surface adsorption. Since the middle of the 90s of the previous century so-called non-evaporable getters (NEGs) were positioned in specifically configured recesses or adjacent to the chip in an enclosure made of ceramics in the form of pellets or stripes. In order to increase the surface area as much as possible the NEGs are frequently made by means of powder metal methods in which the sintering of the metal particles is just initiated so as to preserve small spaces between the metal beads. By means of a temperature activating step in vacuum or in a hydrogen containing reducing atmosphere the surface layer is removed that has formed on the metal during the sintering step. The activation is then completed by continuously heating the entire surrounding structure or by resistance-heating (using an ohmic heater).

The getter material may be selected such that it is able to absorb the gas present in the cavity or, in the case of a gas mixture, to absorb one or more of the components so that the pressure and/or the gas composition in the cavity can be adjusted when the getter is activated. In this case it may be advantageous when the inertial sensor comprises in different cavities different getter materials having respective specific absorption properties or a getter material with identical absorption properties, however in different quantities. In this manner the internal pressure and/or the gas composition may be adjusted individually according to the requirements in cavities of nearly any number.

If in one particularly advantageous embodiment the pressure in the first cavity is between 100 mbar and 200 mbar, then the pressure in the second cavity may be adjusted to values between 0.1 μbar and 1 mbar, preferably between 0.1 par and 0.1 mbar by correspondingly using getter material. At these pressures detection units with a corresponding high quality may be operated in the second cavity, wherein at the same time detection units that require a corresponding low quality and thus a high pressure may be operated in the first cavity due to the usage of the damping structure according to the invention.

Due to usually narrow spaces of the damping structure, i.e. narrow spaces of the first detection unit below the package, unwanted interferences caused by charging effects may occur when operating the sensor. These effects may be avoided according to a further embodiment of the invention by electrically connecting the housing-side section or the housing-side sections of the damping structure with a defined or definable potential, Said electrically conductive connection with a defined potential does however not provide an active electrical excitation or read-out function, but may nevertheless be used to controllably de-tune the movable sensor structure by an applied static bias voltage.

Moreover, the invention relates to a multi-device or multi-component for fabricating an inertial sensor of the type as described above. According to the invention a multi-device is to be understood as a unit, an element or a semi-finished product that is preferably manufactured by using wafer level packaging. In this case functional units of several sensors are arranged on a substrate wafer which then is connected with an accordingly configured cap wafer, as the case may be by applying an intermediate bond frame. In the multi-device fabricated in this manner a plurality of sensors is provided in a matrix-like manner side by side and/or on top of each other. The corresponding multi-device is separated to final sensor modules by means of respective separation techniques.

BRIEF DESCRIPTION OF THE DRAWINGS

Further features and advantages of the invention become apparent with the following in illustrative description of a particularly advantageous embodiment refer to the figures. It is shown in.

DETAILED DESCRIPTION OF EXEMPLARY EMBODIMENTS

Figure 2:
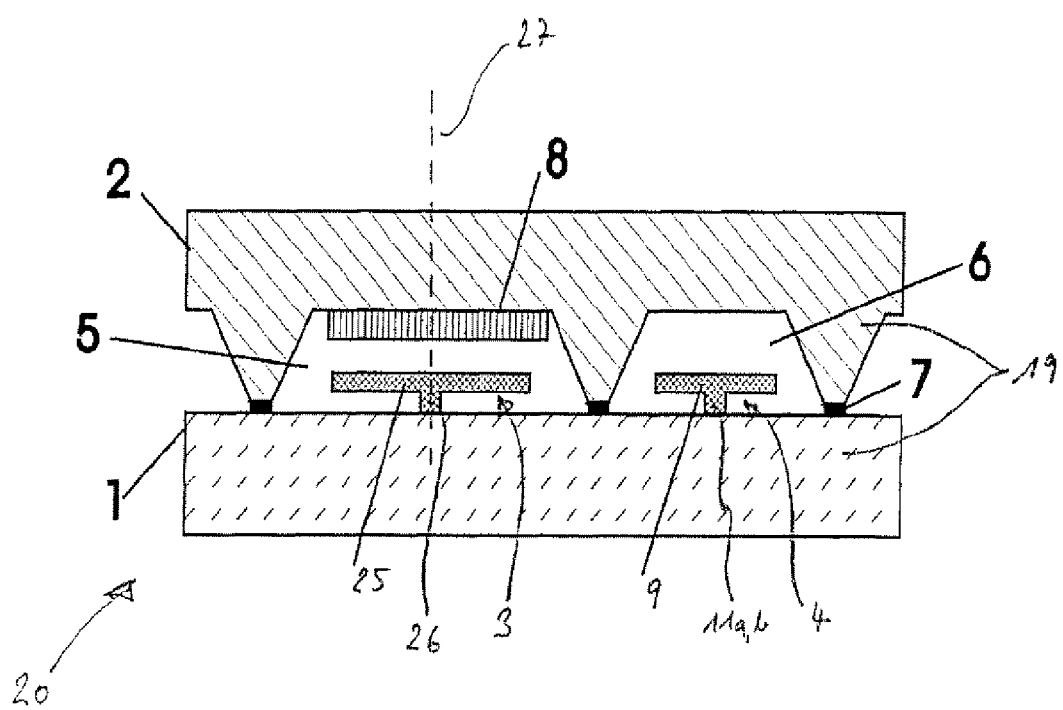

In FIG. 2 there is shown a multi-sensor module 20. It comprises two single sensor modules, i.e. a resonant rotation rate sensor 3 and an acceleration sensor 4, which require very different qualities during operation. The resonant rotation rate sensor 3 is arranged in a first cavity 5, while the acceleration sensor 4 is arranged in a second cavity 6. The first cavity 5 and the second cavity 6 are formed in a package or housing 19 that substantially consists of a substrate 1 and a cap 2 which are connected with each other in a hermetically sealed manner by using a bond frame 7 as an interlayer.

The resonant rotation rate sensor 3 is illustrated in FIG. 2 in a very simplified manner. It comprises a mass unit 25 that is connected to the substrate 1 via suspension 26 such that it may be excited via excitation electrodes that are not shown so as to perform rotational oscillations relative to the housing formed by the substrate 1 and the cap element 2 around the excitation axis 27 indicated in FIG. 2. The mass unit 25 represents, according to the terminology of the general description and the claims, a second detection unit of the inventive acceleration sensor. By means of the resonant rotation rate sensor 3 rotations of the acceleration sensor around axis transverse to the excitation axis may be detected.

Figure 1:
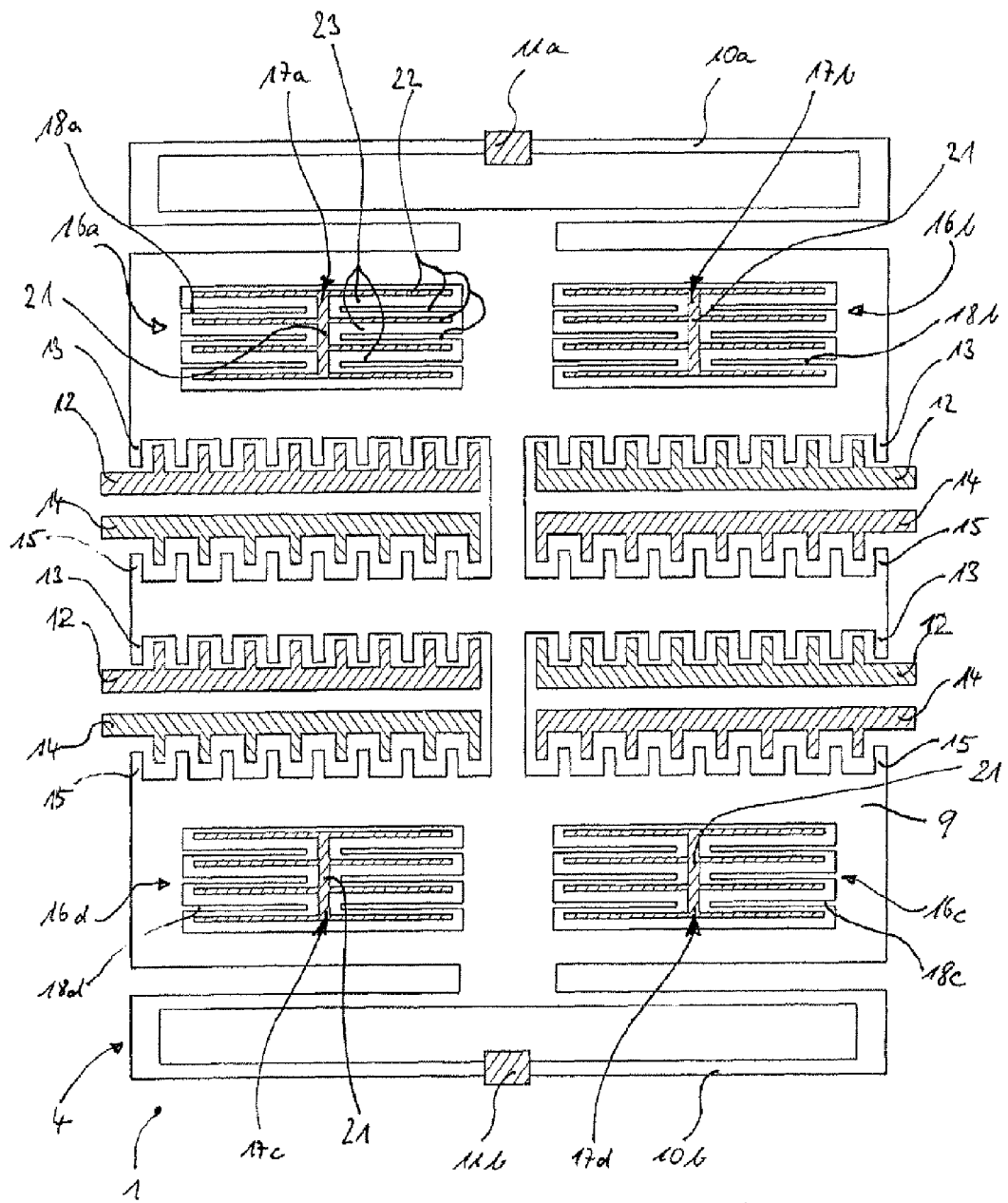
FIG. 1 a schematic sectional view parallel to wafer plane through a part of a multi-sensor module and FIG. 2 a schematic sectional view of the multi-sensor module of FIG. 1 transverse to the wafer plane.

The acceleration sensor 4 is shown in detail in FIG. 1 and comprises a mass unit 9. This mass unit represents, according to the terminology of the general description and the claims, the first detection unit of the illustratively described acceleration sensor. The mass unit 9 acts as inertial mass and serves to detect accelerations in a direction transverse to the drawing plane of FIG. 2, indicated in FIG. 1 by arrow 28 (measurement direction). Under influence of acceleration components in direction 28 the mass unit 9 is displaced relative to the housing formed of substrate 1 and the cap element 2, which displacement is detectable by corresponding measurement electrodes 14, 15.

The bond frame 7 encloses sensor areas and cavities 5, 6 and hermetically seals them with respect to each other and with respect to the surrounding environment. It should be appreciated that the arrangement of the structures of the sensors 3, 4 and of the recesses may of course be different to what is shown in the figure. For example, the sensors 3, 4 may be disposed in a recess of the substrate 1, while the cap element 2 is plane in its inner side or has slight recesses depending on the required space. Instead, the sensors 3, 4 may, if required, be arranged in the cap element 2 so that the afore-mentioned variants would have to realized in a mirror-image-like manner.

The fabrication of the multi-sensor module 20 as illustrated is accomplished via a multi-device by using wafer level packaging. In this case functional units of several multi-sensor modules 20, i.e. a corresponding number of resonant rotation rate sensors 3 and acceleration sensors 4, are arranged on a single substrate wafer 1 that is then connect with a correspondingly configured cap wafer 2 with an intermediate bond frame 7. In the multi-device fabricated in this manner a plurality of multi-sensor modules 20 according to FIG. 2 are provided side by side and on top of each other in a matrix-like arrangement. The multi-device created in this manner is then separated into the final multi-sensor modules 20 via an appropriate separation technique.

Alternatively, the multi-sensor modules 20 may be formed individually from a substrate 1 (for instance as a base chip) supporting the resonant rotation rate sensor 3 and the acceleration sensor 4 and a corresponding cap wafer element 2 (for example, a cap chip) covering the two cavities 5, 6 and concurrently hermetically isolating the same.

Irrespective of whether the multi-sensor module 20 shown in FIG. 2 is fabricated via a multi-device with subsequent separation or directly via a single multi-sensor module, initially the same gas pressure and the same gas composition is present in the two cavities 5, 6. An adjustment of the pressure and/or the gas composition in the first cavity 5 to a value appropriate for the resonant rotation rate sensor 3 is achieved by using a getter material 8 provided within the cavity 5.

The getter material 8 may be arranged within the cavity 5 in any form, e.g., as stripes or areas, it may, however, also have a patterned shape. Beneficially, it is provided on the cap side of the wafer or the like, for example in its recesses when provided therein. Alternatively, the getter material 8 may be positioned on the substrate side, e.g. lateral with respect to the sensors 3, 4 or even below, as long as the corresponding area is not needed otherwise.

The gas atmosphere used for fabricating the multi-sensor module 20 is selected such that it comprises at least one gas species that can be absorbed by the getter material 8. The usage of a pure gas is possible. Due to absorption properties of the getter material 8 after activation with respect to this gas species the first cavity 5 has a different interior pressure and/or gas composition compared to the second cavity 6. In this manner—starting from the gas pressure during the assembly of substrate 1 and cap element 2—the internal pressure prevailing in the first cavity 5 is reduced to value as required to operate the rotation rate sensor 3, for example 0.1 mbar. The pressure and the gas composition existing in the second cavity substantially correspond to pressure and gas composition during assembly of substrate 1 and cap element 2.

The adjustment of the pressure conditions in the cavity 5 by using the getter material, however, is restricted. If the inner pressure of the cavity 5 is to be lowered to a value of about 0.1 mbar, as it is required for a proper operation of the resonant rotation rate sensor 3 arranged therein, the maximum possible pressure prior to the activation is about 200 mbar. This pressure corresponds to the pressure prevailing in the second cavity 6, in which the acceleration sensor 4 is positioned. This pressure is, however, too low for a correct and reliable operation of the acceleration sensor 4, which is too sensitive with respect to interfering influences at such a pressure, for instance owing to vibrations, and thus cannot be operated with the corresponding quality.

Due to this the acceleration sensor 4 is provided with a damping structure 16a, b, c, d. Its configuration is illustrated in more detail in FIG. 1, which shows a schematic view on the acceleration sensor 4. The mass unit 9 is connected to the substrate 1 via suspension springs 10a, b and corresponding anchor structures 11a, b. By means of the damping structure 16, b, c, d the quality factor along measurement direction 28 is lowered to below 1, which corresponds to a back fill pressure of about 600 mbar to 1000 mbar at an inner pressure of about 200 mbar prevailing in the second cavity. The sensor 4 is thus insensitive to vibrations acting in measurement direction 28, however without loosing its measurement sensitivity with respect to accelerations acting in measurement direction.

The damping structure 16a, b, c, d substantially consists of a fixed damping comb 17a, b, c, d that is firmly positioned on the substrate 1. The fixed damping comb 17a, b, c, d cooperates with a counter damping comb 18a, b, c, d that is realized by a corresponding design of the mass unit 9. The fixed damping comb 17a, b, c, d comprises comb fingers 22 extending in a comb-like manner from a central region 21, between which spaces 23 of concerning from. Comb fingers 24 of the counter damping comb engage with these spaces. The comb fingers 22, 24 are oriented transverse to the measurement direction 28.

The damping structure 16a, b, c, d operates like a piston-cylinder-system. When the mass unit 9 due to an external acceleration moves along measurement direction 28 relative to the substrate 1, there is a displacement of the fixed damping comb 17a, b, c, d with respect to the counter damping comb 18a, b, c, d along measurement direction 28. This displacement causes a displacement of gas present in the spaces 23 between the damping combs 17a, b, c, d; 18a, b, c, d. The gas must flow from one side of a comb finger 22, 24 to the other side and through the spaces 23 formed as narrow gaps or constrictions between the comb fingers 22, 24 and substrate 1, mass unit 9 and cap wafer 2. Due to the narrow gap dimension there is a partly significant resistance to the form that creates the desired damping effect.

A movement of the mass unit 9 relatively to the housing formed by the substrate 1 and the cap wafer 2 is detected via fixed measurement electrodes 14 and counter measurement electrodes 15. The measurement electrodes 14 are arranged fixed to the substrate 1, the counter measurement electrodes are fixed to the mass unit 9. For the purpose of testing, the acceleration sensor 4 shown in FIG. 2 comprises a fixed excitation electrode 12 and a corresponding counter electrode 13. The mass unit 9 of the acceleration sensor 4 can be excited in measurement direction 28 by means of an excitation via this arrangement. The whole purpose of this excitation is to perform an electrical functional test without an external mechanical excitation, which may be very helpful during a testing on wafer level prior to capping and dicing.

The fixed damping comb 17a, b, c, d is connected to a definable or defined electrical potential via the substrate 1. This has the purpose to substantially avoid charging effects which may occur due to the narrow spaces 23 and thus to inhibit a non-controlled adhesion of the comb finger structures 22, 24 with each other.

The invention claimed is:

1. An inertial sensor in form of a microelectromechanical device,
    comprising a housing with at least one first gas-filled cavity, in which cavity a first detection unit is arranged movably relative to said housing for detecting an acceleration to be detected, said inertial sensor comprising a damping structure for damping movement of said first detection unit in said housing at least along an inertial sensor measurement direction, wherein said housing comprises at least a second cavity, wherein a second detection unit and a getter material are arranged in said second cavity, wherein said damping structure is formed by arranging and configuring at least sections of said first detection unit and of said housing so as to form a clearance therebetween in form of a narrow or constriction, wherein gas present in said first cavity flows through said clearance when said first detection unit moves at least along measurement direction, wherein a housing-side section of the damping structure comprises an electrically conductive connection with a defined potential which does not provide any active electrical excitation or read-out function.

2. The inertial sensor of claim 1, wherein said first and second cavities are hermetically sealed against each other and against the environment.

3. The inertial sensor of claim 1, wherein at least sections of said first detection unit and of said housing are each configured in a comb-like manner so as to provide a comb-like structure having comb fingers and clearances located in between.

4. The inertial sensor of claim 3, wherein said comb fingers of the first detection unit engage with said clearances of the comb-like structure of said housing and vice versa.

5. The inertial sensor of claim 3, wherein said comb fingers of the comb-like structure are arranged transversely with respect to measurement direction.

6. The inertial sensor of claim 1, wherein the pressure in said first cavity is between 100 mbar and 300 mbar.

7. The inertial sensor of claim 1, wherein pressure in said second cavity is between 0.1 μbar and 1 mbar.

8. The inertial sensor of claim 1, wherein said first cavity has a different gas composition compared to said second cavity.

9. The inertial sensor of claim 1, wherein a housing-side section of said damping structure is electrically connected to a defined potential.

10. The inertial sensor of claim 1, wherein said second detection unit arranged in said second cavity forms a resonant rotation rate sensor.

11. The inertial sensor of claim 1, wherein a getter material is provided in said first cavity, the gas absorption capabilities of which differ from those of the getter material in said second cavity.

12. The inertial sensor of claim 1, wherein said first and second cavities contain a same getter material, however in a different amount or area relative to the cavity volume.

13. The inertial sensor of claim 6, wherein pressure in said first cavity is 200 mbar.

14. The inertial sensor of claim 7, wherein pressure in said second cavity is between 0.1 μbar and 0.1 mbar.

15. The inertial sensor of claim 14, wherein pressure in said second cavity is 0.1 mbar.

16. The inertial sensor of claim 1, the microeletromechanical device being an acceleration sensor or a multi-axis acceleration sensor.

* * * * *